UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

NAPHTHAZARIN INTERMEDIATE DYE AND PROCESS OF MAKING SAME.

SPECIFICATION forming part of Letters Patent No. 631,614, dated August 22, 1899.

Application filed August 10, 1898. Serial No. 688,275. (No specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a New Coloring-Matter, of which the following is a specification.

As is well known, naphthazarin can be prepared by heating 1.5-dinitro-naphthalene with concentrated or fuming sulfuric acid with or without the addition of reducing agents. In this manufacture a body is formed which is known as the "naphthazarin intermediate product." The chemical constitution of this body has never been definitely ascertained and described, and the substance is known under this name only both in patents and in general scientific literature. It is more particularly described in the specification of the German patent, No. 76,922, published on the 21st of August, 1894, in the following terms: "Its solution in concentrated sulfuric acid (containing about ninety-five per cent. $H_2SO_4$) is brown. In dilute sulfuric acid it dissolves with a pure blue color. This color is not appreciably changed on adding caustic-soda lye; but if an excess of hydrochloric acid be added to the dilute sulfuric-acid solution the color turns to a greenish brown. When isolated, this naphthazarin intermediate product is a violet powder, possessing a metallic luster, slightly soluble in water and giving a blue solution, which is not changed in color by the addition of sodium carbonate or of a caustic-soda lye. In the presence of a little hydrochloric acid it dissolves readily with a pure blue color. If the solution in dilute sulfuric acid be boiled, the blue color changes to red and on cooling naphthazarin separates out." It is this naphthazarin intermediate product, which can be obtained as described from 1.5-dinitro-naphthalene, which constitutes the initial material for my invention. My present invention relates to the discovery that on reduction this intermediate product is converted into a new product, which apparently stands to it in the relation of a leuco-compound and which can be used directly in dyeing on chrome-mordants. The new product is but little soluble in water and can therefore be readily isolated. When dyeing, the new product can either be used directly or in the form of its bisulfite compound. The shades obtained are of a greener cast than those yielded by naphthazarin. They are very fast to light.

The following example will serve to illustrate the nature of the invention and the manner in which it can be carried into practical effect and my new product obtained. The parts are by weight.

Prepare a naphthazarin melt in the usual way by heating 1.5-di-nitro-naphthalene with concentrated or fuming sulfuric acid with the addition of a suitable reducing agent. Pour five hundred (500) parts thereof (corresponding to fifteen (15) parts naphthazarin) into two thousand five hundred (2,500) parts of water. Filter the solution. Next add a solution of forty (40) parts tin salt (stannous chlorid) in two hundred (200) parts of hydrochloric acid, (containing about thirty-two per cent. real HCl.) The deep-blue-colored solution changes first to red, and the mixture finally becomes almost colorless, while the new product separates out in fine needles almost colorless. Filter, wash with water, and either dry or preferably preserve for use in the form of paste.

Instead of taking the naphthazarin melt itself in the above example, the isolated intermediate product, say, in the form of its sodium salt can be submitted to the reduction process.

Instead of the hydrochloric-acid solution of stannous chlorid, other reducing agents can be used.

In the moist state the new product presents the appearance of almost colorless crystals. When dry, the crystals appear bluish. It is soluble in sodium carbonate, giving a red-violet color. Its solution in caustic-soda lye is red and becomes blue violet in contact with the air, and a precipitate having a metallic luster separates out. It is but slightly soluble in water; but on boiling a somewhat bluish solution is obtained. Its solution in concentrated sulfuric acid is red, turning brown on heating.

Now what I claim is—

1. The new coloring-matter which can be obtained from the naphthazarin intermediate product, as hereinbefore defined, by reduction and which is soluble in caustic-soda lye giving a red solution which becomes blue violet on exposure to air while depositing a precipitate, and which also yields a red solution in cold concentrated sulfuric acid turning brown on heating.

2. The process for the production of a new coloring-matter consisting in subjecting the naphthazarin intermediate product, as hereinbefore defined, to the action of a reducing agent, substantially as described.

In testimony whereof I have hereunto set my hand in the presence of two subscribing witnesses.

RENÉ BOHN.

Witnesses:
GUSTAV L. LICHTENBERGER,
ADOLPH REUTLINGER.